United States Patent
Vilppola et al.

(10) Patent No.: US 8,839,458 B2
(45) Date of Patent: Sep. 16, 2014

(54) METHOD, APPARATUS, AND COMPUTER PROGRAM FOR PROVIDING APPLICATION SECURITY

(75) Inventors: Kari M. Vilppola, Kiiminki (FI); Tommmi O. Manttari, Ii (FI)

(73) Assignee: Nokia Corporation, Espoo (FI)

( * ) Notice: Subject to any disclaimer, the term of this patent is extended or adjusted under 35 U.S.C. 154(b) by 627 days.

(21) Appl. No.: 12/464,414

(22) Filed: May 12, 2009

(65) Prior Publication Data

US 2010/0293614 A1 Nov. 18, 2010

(51) Int. Cl.
G06F 7/04 (2006.01)
G06F 21/51 (2013.01)
G06F 21/52 (2013.01)
H04L 9/32 (2006.01)
G06F 21/74 (2013.01)

(52) U.S. Cl.
CPC .......... *G06F 21/51* (2013.01); *H04L 2209/127* (2013.01); *H04L 9/3236* (2013.01); *G06F 21/74* (2013.01); *G06F 21/52* (2013.01)
USPC ....................................................... 726/30

(58) Field of Classification Search
CPC ......... G06F 21/51; G06F 21/52; G06F 21/57; G06F 21/64; G06F 21/74; H04L 2209/127; H04L 9/3236
USPC .......................................................... 726/30
See application file for complete search history.

(56) References Cited

U.S. PATENT DOCUMENTS

| | | | |
|---|---|---|---|
| 5,493,649 A | | 2/1996 | Slivka et al. |
| 5,944,821 A | * | 8/1999 | Angelo ............................ 726/22 |
| 6,026,293 A | * | 2/2000 | Osborn .......................... 455/411 |
| 6,212,592 B1 | * | 4/2001 | Klein ............................ 710/260 |
| 6,216,014 B1 | * | 4/2001 | Proust et al. ................... 455/558 |
| 6,694,434 B1 | * | 2/2004 | McGee et al. ................. 713/189 |
| 6,708,274 B2 | * | 3/2004 | Herbert et al. ................ 713/190 |
| 6,735,700 B1 | * | 5/2004 | Flint et al. ....................... 726/24 |
| 6,775,536 B1 | * | 8/2004 | Geiger et al. ................. 455/411 |
| 7,137,004 B2 | * | 11/2006 | England et al. ............... 713/176 |
| 7,434,259 B2 | * | 10/2008 | Hofmeister et al. ............ 726/22 |
| 7,467,285 B2 | * | 12/2008 | Khosravi et al. .............. 711/206 |
| 7,526,811 B1 | * | 4/2009 | Taylor ............................ 726/26 |
| 2004/0025022 A1 | * | 2/2004 | Yach et al. .................... 713/176 |

(Continued)

FOREIGN PATENT DOCUMENTS

WO WO0072149 11/2000

OTHER PUBLICATIONS

MSDN, Locks, Deadlocks, and Synchronization, Microsoft, 2004, Retrieved from the Internet <URL: msdn.microsoft.com/en-us/library/ms810047.aspx>, pp. 1-28 as printed.*

(Continued)

*Primary Examiner* — Michael Chao
(74) *Attorney, Agent, or Firm* — Alston & Bird LLP (57) ABSTRACT

In response to an initialization of the apparatus, a validation value is calculated for each of a plurality of application executable files and the validation values are stored in a protected memory portion of random access memory. An attempt to launch an application on the apparatus is determined, and a current validation value for an executable file associated with the application is calculated. The current validation value is compared with a corresponding one of the stored validation values, and launching of the application is regulated based on results of the comparison.

14 Claims, 5 Drawing Sheets

(56) References Cited

U.S. PATENT DOCUMENTS

| | | | |
|---|---|---|---|
| 2004/0111618 A1* | 6/2004 | Vaha-Sipila | 713/176 |
| 2006/0136745 A1 | 6/2006 | Taylor | |
| 2006/0137007 A1* | 6/2006 | Paatero et al. | 726/22 |
| 2006/0161761 A1* | 7/2006 | Schwartz et al. | 711/216 |
| 2007/0150966 A1* | 6/2007 | Kirschner et al. | 726/30 |
| 2007/0226795 A1* | 9/2007 | Conti et al. | 726/22 |
| 2007/0240217 A1 | 10/2007 | Tuvell et al. | |
| 2010/0169967 A1* | 7/2010 | Khosravi et al. | 726/22 |

OTHER PUBLICATIONS

Kernel Mode Definition, 2004, Retrieved from the Internet <URL: linfo.org/kernel_mode.html>, pp. 1-2 as printed.*

Sailer et al., Design and Implementation of a TCG-Based Integrity Measurement Architecture, 2004, IBM, Retrieved from the Internet <URL: http://users.ece.cmu.edu/~adrian/731-sp04/readings/rc23064.pdf>, pp. 1-17 as printed.*

Sep. 21, 2010, International Search Report and Written Opinion from International Application No. PCT/US2010/001102 dated Sep. 21, 2010, 12 pages.

Korean Office Action for Application No. 2011-7029612, dated Jan. 4, 2013.

Supplementary European Search Report for Application No. EP 10 77 4606 dated May 2, 2014.

* cited by examiner

METHOD, APPARATUS, AND COMPUTER PROGRAM FOR PROVIDING APPLICATION SECURITY

TECHNICAL FIELD

This specification relates in general to computer security, and more particularly to systems, apparatuses, computer programs, and methods for application security in mobile software platforms.

BACKGROUND

In the early days of wireless telephony, most mobile devices such as cellular phones were embedded devices, e.g., special purpose devices having a fixed set of programs for performing a few dedicated functions. In recent years, mobile devices (e.g., "smart phones") have evolved into general-purpose computing devices that can accept changes to existing functionality and add new functions. This can be achieved by updating existing programs and/or adding new programs to the devices.

It was often the case that the only legitimate source of new or modified programs for mobile devices were the device manufacturers and/or service carriers involved in creating and providing services to the devices. While this allows manufacturers and service providers to maintain close control over how the devices are used, consumers have been demanding their mobile devices perform a larger variety of functions. Some of these functions are highly specialized or targeted to small groups of users. As such, even if such features are compatible with existing devices and service networks, it may not be profitable for the manufacturers and service providers themselves to produce software that provides such features.

Recently, mobile software platforms have become more open to allowing application software developed by third parties to be installed and run. For example, there are large and active communities of application developers for mobile operating systems such as Symbian™, iPhone™ OS, and Android™. These communities of third-party developers may include trusted and non-trusted software vendors. Trusted developers may include businesses and other entities that participate in a certification program, or otherwise have strong motivations (e.g., legal liability) in making sure that the software they provide is safe and reliable.

Although a developer may be classified as untrusted, this does not necessarily imply that the developer's software is unsafe or unreliable, only that the safety of such software is unknown. While the use and availability of untrusted software may be troubling to those to whom security is the overriding concern (e.g., government, business enterprises), it is generally seen as a net benefit to allow anybody to write and publish software. Oftentimes the most imaginative new products come from individuals or small groups of independent developers. Also, software is one area where it is possible for small groups or individuals to produce products that are just as reliable and easy to use as corporate-produced software (sometimes even more so). Therefore enabling small developers to contribute to a mobile computing platform can help the platform remain vital and profitable for stakeholders.

For manufacturers and software/service providers, security related threats due to untrusted software must be dealt with. Even if the manufacturers and providers are not the source of untrusted software that may pose a threat, their reputations may become tarnished if their platforms are seen as easily exploited by malware. Even if software is not intentionally malicious, unreliable or corrupted software running on their platforms cause device and/or system failures, and this can reflect badly on providers and manufacturers.

SUMMARY

The present specification discloses systems, apparatuses, computer programs, data structures, and methods for providing application security. In one embodiment, an apparatus includes random access memory having a protected memory portion. The apparatus includes a processor coupled to the random access memory. The processor is configured with executable instructions that cause the apparatus to, in response to an initialization of the apparatus, calculate a validation value for each of a plurality of application executable files and store the validation values in the protected memory portion. An attempt to launch an application on the apparatus is determined by the processor, and a current validation value for an executable file associated with the application is calculated. The processor compares the current validation value with a corresponding one of the stored validation values, and regulates launching of the application based on results of the comparison.

In more particular embodiments, the executable instructions may further cause the apparatus to, in response to a run-time event unrelated to launching of the application, recalculate a validation value for the executable file associated with the application and compare the calculated value with the stored validation value to ensure that the application have not been tampered. In case the values do not match, the application is treated as untrusted and no further access to it is granted and any pending access operations (e.g. reading and execution) on it may be terminated. The run-time event may include any combination of paging of the executable file and a passage of time since a previous calculation of the corresponding stored validation value.

In case of installation of a new application a new validation value is calculated for the application and it is stored to the protected memory portion. In case of reinstallation of any existing application the corresponding stored validation value in the protected memory portion for the application is replaced with the recalculated value. The stored validation value for the installed application may be calculated by the used validation algorithm or may be just separately generated right after successful application validation.

In other more particular embodiments, the executable instructions may further cause the apparatus to establish a priority for each of the plurality of application files based on expected usage, and wherein the calculation and storage of the validation values in the protected memory portion is governed by the respective priorities.

In other more particular embodiments, the calculation and storage of the validation values in the protected memory portion may occur in parallel with determining the attempt to launch the application program. In such a case, the executable instructions may further cause the apparatus to: a) determine that the corresponding stored validation value is unavailable when comparing the current validation value with the corresponding validation value; and b) cause the calculation and storage of the corresponding validation value to occur at a higher priority to facilitate comparing the current validation value with a corresponding one of the stored validation values.

In another embodiment of the invention, a method involves, in response to an initialization of an apparatus, calculate a validation value for each of a plurality of application executable files and store the validation values in a protected memory portion of random access memory of the apparatus. An attempt to launch an application on the apparatus is determined and a current validation value for an executable file associated with the application is calculated. The current validation value is compared with a corresponding one of the stored validation values, and launching of the application is regulated based on results of the comparison.

In a more particular embodiment, the method may further involve, in response to a software initialization event of the application, calculating an updated validation value for the executable file associated with the application. In such a case, the corresponding stored validation value is replaced in the protected memory portion with the updated validation value. The software initialization event in such a case may include any combination of reinstallation of the application and validation of the application during a post-initialization run-time of the apparatus.

In another embodiment of the invention, a computer-readable storage medium is encoded with instructions that, when executed by an apparatus, perform: a) in response to an initialization of the apparatus, calculating a validation value for each of a plurality of application executable files and store the validation values in a protected memory portion of random access memory; b) determining an attempt to launch an application on the apparatus; c) calculating a current validation value for an executable file associated with the application; d) compare the current validation value with a corresponding one of the stored validation values; and d) regulating launching of the application based on results of the comparison.

In another embodiment of the invention, a method involves, in response to a modification event of an application on an apparatus, calculating a validation value for one or more executable files associated with the application. The validation values are stored in a protected memory portion of random access memory of the apparatus. An attempt to launch an application on the apparatus is determined, and a current validation value is determined for an executable file associated with the application. The current validation value is compared with a corresponding one of the stored validation values, and launching of the application is regulated based on results of the comparison. The modification event may include any combination of initial installation of the application, reinstallation of the application, and a validation of the application during a run-time of the apparatus.

These and various other advantages and features are pointed out with particularity in the claims annexed hereto and form a part hereof. However, for a better understanding of variations and advantages, reference should be made to the drawings which form a further part hereof, and to accompanying descriptive matter, in which there are illustrated and described representative examples of systems, apparatuses, computer program products, and methods in accordance with example embodiments of the invention.

BRIEF DESCRIPTION OF THE DRAWINGS

The invention is described in connection with example embodiments illustrated in the following diagrams.

DETAILED DESCRIPTION

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the present invention.

Generally, the present disclosure is related to improvements to mobile computing frameworks to ensure that the application software is not tampered after the original installation validation procedure. Such validation can ensure that application software has not been changed or corrupted, and so can be safely run. Software corruption may occur by accident, such as due to data corruption caused by user and/or system interactions. Such corruption may also occur on purpose, such as from malicious software running on the device or by actions of the user (e.g., to override corporate security precautions on a user's work device).

In the description that follows, the term "validation data" may be used to indicate any single value (e.g., word of fixed bit size) that is used to identify a state of a block of data (e.g., a file). A checksum or cryptographic hash may be used as validation data. Generally, the algorithm for generating the validation data should be chosen such that there is a statistically insignificant chance that any change to the block of data will generate a validation value identical to the value for the unmodified block of data. Such changes may include having data added or subtracted to/from the block of data, or having any portion of the data changed with no net change in size of the block.

A software platform may protect executables and other data from tampering by validating the software to be launched using validation data such as a checksum and/or cryptographic hashes. For example, after the software has been successfully installed in the system, a hash may be calculated for all critical files such as executables and configuration data. This hash may include a checksum or a similar variable derived using any hashing-type function known in the art. This variable is stored to special file system location in persistent storage (e.g., hard drive, flash memory). Later on when the software is launched, the system recalculates the hash and compares it to previously stored value. If the comparison is successful, then the launching may proceed because as the critical data for the application has not been tampered with.

The platform described above may be vulnerable to compromise if the persistent file system of the platform cannot provide enough protection to prevent a malicious overwrite of the persistently stored checksum data. For example, a hostile user/software can benefit from knowledge of this data stored on a disk drive or flash memory to modify key files, recalculate the hash values on modified files, and replace the stored values with the recalculated values. This may allow the system to launch tampered or non-validated software to run in the mobile device.

One way to overcome the deficiencies noted above is seen in FIG. 1, which illustrates aspects of a security platform 100 according to an embodiment of the invention. The security platform 100 can verify the integrity of application files before they are launched. The security platform 100 uses random access memory (RAM) for storing checksum data associated with the applications. The platform 100 uses memory access protection as indicated by block 104. The memory access protection 104 may be provided by any combination of hardware and software features.

Figure 1:
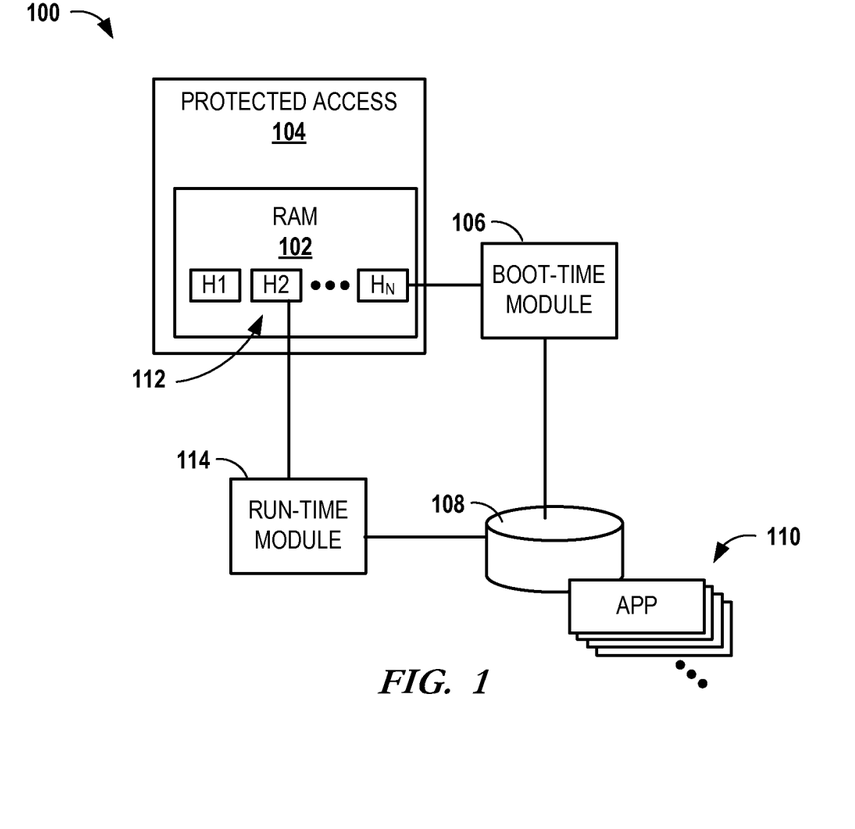
FIG. 1 is a block diagram of a mobile security framework according to an example embodiment of the invention.

In one example of memory access protection 104, certain hardware and memory access may be restricted by way of hierarchical protection domains defined in the central processing unit (CPU) architecture. In such a case, a processor may include a "system" execution mode that enables execution of all instructions, including privileged instructions. In system mode, processes may be given access to a different address space than is provided on less protected modes (e.g., "user" mode) as well as access to memory management hardware and to other peripherals. For example, the operating system kernel usually has access to memory in system mode, while user programs (e.g., a word processor) cannot access this memory directly. User mode may be used to "sandbox" all software that has a higher potential of malfunctioning in regular use (e.g., application software). All user mode access attempts to system mode resources are performed through system calls that are securely controlled. If a user mode process attempts an invalid or non-accessible system call, then the user mode process can be gracefully terminated without affecting the rest of the system.

The architecture 100 includes a boot-time module 106 that prepares validation data upon power on, reset, or other initialization condition associated with hardware of the architecture 100. Generally, the boot-time module 106 may read through persistent storage 108 and calculate validation values (e.g., checksum, hash) of critical files associated with a number of applications 110. These validation values are shown as values 112 ($H1$-$H_N$) that are stored by the boot-time module 106 in protected RAM 102. The location of the values 112 may be kept and maintained by the boot-time module 106 while the system continues to run, or may be passed to other modules for use, such as run-time module 1 14.

After the boot-time module 106 has validated the applications 110 and stored the values 112, the run-time module 114 can recalculate the same values on critical files of any of applications 110 when a request is received to execute the applications 110. The run-time module 114 can also access the corresponding values 112 in RAM 112, such as by communication with and/or integration with the boot-time module 106. If the recalculated value matches the corresponding value 112 in RAM 102, then execution of the application 110 is allowed by the run-time module 114. Otherwise, the runtime module 114 may refuse to run the application 110, and take other appropriate actions (e.g., log a system error, warn the user). The runtime module 114 may regulate the execution of the application 110 in other ways if the currently recalculated value does not correspond to the stored value, such as lowering access privileges for the process, running in a virtual "sandbox," etc.

It will be appreciated that any one of the boot-time and run-time modules 106, 114 can perform similar validation procedures for applications 110 newly installed at runtime. For example, if an application is downloaded and installed, one or both of the modules 106, 114 may coordinate to calculate validation data 112 for the newly installed application and add it to protected RAM 102. Thereafter, if the newly added application is run without the system being rebooted or reset, the run-time module 114 can validate the new application in the usual way.

The illustrated software platform 100 does not rely on storage of hash/checksum data on a persistent file system (e.g., storage device 108). Instead the data is stored only to RAM 102 after successful installation/validation procedure by run-time module 106. Because the platform 100 provides memory protection 104, hostile or malfunctioning software cannot access the RAM 102 and modify the stored values 112. A hash/checksum check done by the run-time module 114 before application software is launched ensures that software is valid and has not been corrupted or tampered with prior to execution.

Because the validation data 112 is not stored to permanent and/or persistent memory, the validation data 112 may need to be calculated again after device booting, e.g., by running a validation procedure the same as or similar to the validation originally used to install the software applications 110. Depending on processor speed, number of applications, etc., boot-time validation may take an appreciable amount of time. This is alleviated somewhat in mobile devices because they are often always on (either in powered or stand-by mode) and may not be rebooted for weeks or months at a time. Further, various schemes may be employed to reduce the impact of application validation on booting times.

In some embodiments, the boot-time validation may be handled in the background after critical system files have been verified. Generally, it is possible to track the most used software on the device, and ensure that this software is given top priority. This allows the user to use some features of the mobile device at the same time validation is being performed on lesser-used applications. Also software that is "always-on" may be given top priority, such as software that listens to network events and prompt/display data to the user in case a new event is received. If a user (or system) requests to use application software before the validation for that software has been started, the system may include provisions to prioritize the validation procedure to minimize launch time of the requested application. This may involve stopping any current validation actions and moving the requested software to the top of the queue for immediate validation by the boot-time module 106. This may also involve given any threads or processes that are handling the validation higher CPU priority (e.g., as is possible in a pre-emptive multitasking operating system).

Figure 2:
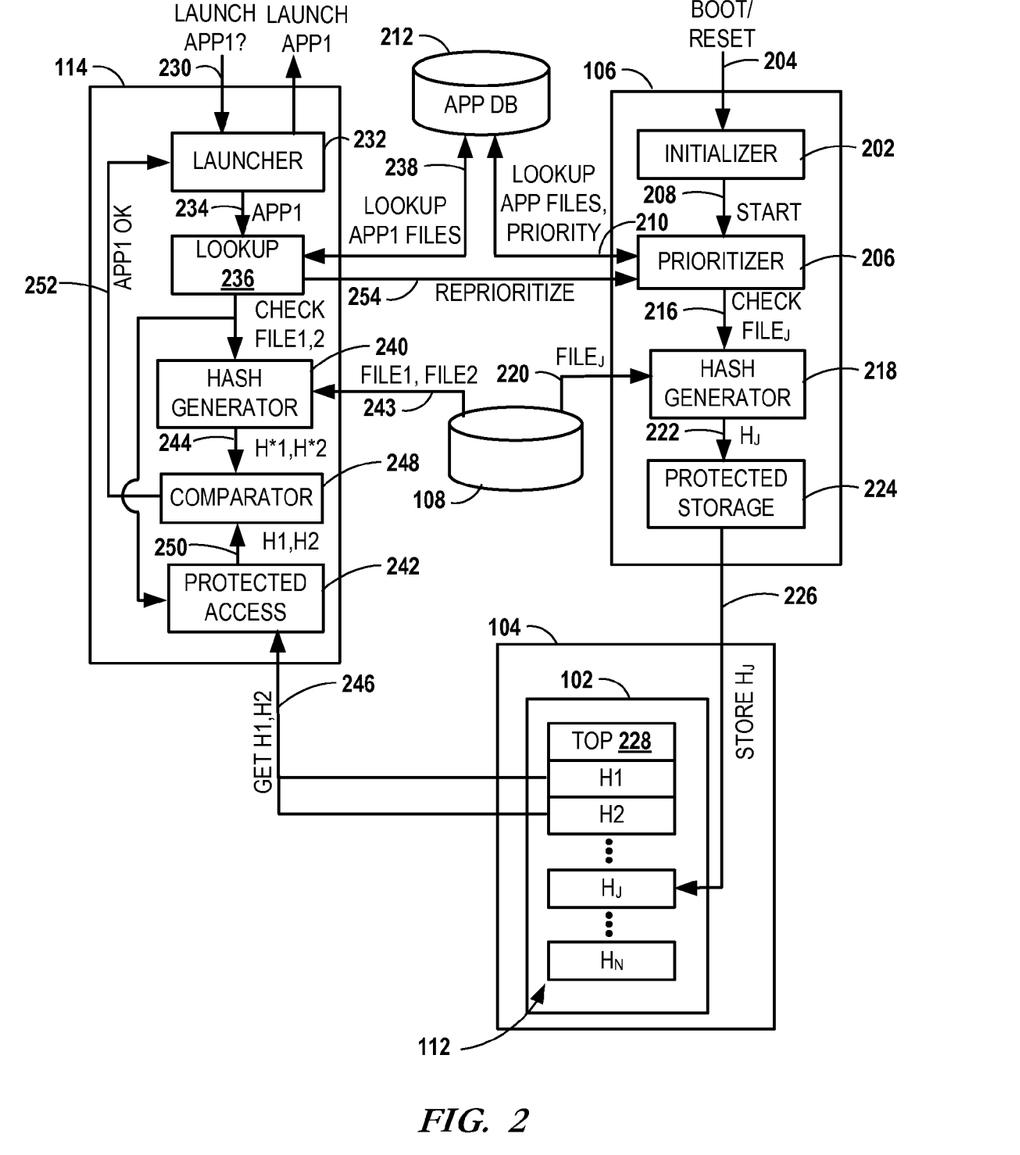
FIG. 2 is a block diagram of mobile security framework details according to an example embodiment of the invention.

In reference now to FIG. 2, a block diagram illustrates a more detailed view of secure architecture components according to an example embodiment of the invention. Components in FIG. 2 may include the same reference numbers as similar or analogous components of FIG. 1. For example, boot-time module 106 is configured to access RAM 102 in protected memory space 104, and may access application data (e.g., files) in persistent data store 108.

The boot time module 106 may include an initializer 202 that receives a boot and/or reset signal 204 as input. The boot/reset signal 204 may be provided by hardware and/or software. The latter may include bootloaders, boot scripts, or any other software that performs some level of system initialization. In response to the signal 204, the initializer 202 signals 208 to a prioritizer 206 to begin selecting files and/or other system data for validation. The prioritizer 206 may access 210 a database 212 that contains a current application priority, and enables mapping applications to particular files. For example, one application may include any combination of executables, configuration files, object files, libraries, etc., that are needed in order to run. Only a subset of these files may need to be validated. For example, the critical application files can be capsulated to single package (e.g., to a zip archive) and files may be only accessible from the package. In such a case, validation may be done once for the whole package instead of the single files inside the package.

The database 212 may include temporary or persistent storage, and may be altered and/or updated by the boot-time module 106. For example, as usage patterns change, priorities of application and file validation may change. The database 212 may include any data structure, such as a linked list that is traversed from start to finish. The database 212 may include more complicated structures that enable fast lookups (e.g., binary trees, hash sets) and may provide high-level features associated with full-featured relational databases, such as utilizing searches and queries to find data.

For each file found in the database 212, the prioritizer 206 may send (e.g., via signal 216) a file reference to a hash generator 218. The reference 216 sent may include a filename or other data appropriate to filesystem 108 (e.g., handles, pointers, inodes, etc.). The hash generator 218 retrieves the file data 220 and generates a hash 222 (or similar value). The hash value 222 is sent to a protected storage component 224 which stores 226 the value 222 in the appropriate location in RAM 102 with the set 112 of hash/validation values.

The validation values 112 may be stored in a contiguous block of memory as a list, and in such a case may be referenced by a single value, e.g., a pointer 228 to the top of the list. The values 112 may be stored in any other data structure known in the art. Depending on the frequency of lookups and availability of space in protected RAM 102, the values may be stored as data structures that allow faster lookups than a list, such binary trees, hash sets, etc.

The run-time module 114 is also shown coupled to the RAM 102 in protected memory space 104 and persistent data store 108. A launcher component 232 of the run-time module 114 may receive at a request 230 associated with launching an application. The request 230 may result in the launcher 232 actually launching the program (e.g., instantiating a new system process associated with the application) or may merely cause the launcher component 232 to forward the request if the application has been verified.

The launcher sends a request 234 to a lookup component 236 to determine all of the critical files associated with the requested application. The lookup component 236 may access the database 212 to determine this data, as represented by path 238. Upon obtaining this list of files, the lookup module sends the list to both a hash generator component 240 and a protected access module 242. The hash generator 240 may use the same algorithms and/or code as the hash generator 218 that initially generated the validation values 112 currently in memory 102. The hash generator 240 retrieves the file data as represented by path 243, and outputs the hash values via path 244 to comparator 248.

Contemporaneously with the generation of hashes by the component 240, the protected access module 242 retrieves 246 the stored values in RAM 102, which are also passed to the comparator 248 via path 250. The comparator 242 compares the stored validation values 250 with the generated values 244 and outputs a signal 252 that is sent to the launcher 232 indicating whether there is a match. If the signal 252 indicates a match, it may be assumed the application is acceptable for execution, and the launcher 232 can output a signal 254 that indicates success and/or causes the application to launch.

As previously mentioned, the insertion of values 112 into RAM 102 by the boot-time component 106 may occur both during and after boot. In the latter case, the situation may exist where the run-time module 114 needs access to a validation value stored in protected RAM 102 before it has been calculated. As seen in FIG. 2, the lookup module 236 may determine (directly or indirectly) that needed values have not yet been calculated, and may send a reprioritize signal 254 to the prioritizer 206 to cause such calculations to be given high or immediate priority. This signal 254 may cause the run-time module 114 to block validation until the validation values are placed in RAM 102.

The functional components shown in FIG. 2 are merely an example arrangement intended to illustrate various aspects of the invention. Those of skill in the art will appreciate that many variations are possible in light of these teachings. For example, the boot-time and run-time modules 106, 114 may be combined into a single functional unit/process, or may be separated into even smaller independently functioning units/processes. Various interfaces may use additional measures to prevent exposure of validation data to external analysis, such as using encrypted communications between the various components of the modules 106, 114 and RAM 102, filesystem 108 and/or database 212.

It will be appreciated that the illustrated embodiments can help ensure that critical files are uncompromised during the launching of application software. One issue that may arise includes cases where code is dynamically loaded at runtime. For example, a system may use on-demand paging, which causes code to be loaded from the hard disk to RAM when needed for the execution. In such a case, some portions of code may not be loaded into RAM when the application first launches, but may be placed into memory later as particular functionality is accessed. In such a case, hostile users or software may be able to overwrite application after the validation check, but before the actual code is loaded for execution into RAM.

One way of dealing with on-demand paging is to implement a periodical checksum check that ensures integrity of application software while at least some portion of the software is running. For example, if access to an on-demand page is detected for a particular application, the paged portion (or the entire application) may be revalidated. In other cases, if apparent performance is not affected (e.g., when the device is in an idle state), periodic revalidation may occur, e.g., at random intervals.

Many types of apparatuses may be used for validating applications as described herein. For example, users are increasingly using mobile communications devices (e.g., cellular phones) as primary computing devices. In reference now to FIG. 3, an example embodiment is illustrated of a representative mobile apparatus 300 capable of carrying out operations in accordance with example embodiments of the invention. Those skilled in the art will appreciate that the example apparatus 300 is merely representative of general functions that may be associated with such devices, and also that fixed computing systems similarly include computing circuitry to perform such operations.

The user apparatus 300 may include, for example, a mobile apparatus, mobile phone, mobile communication device, mobile computer, laptop computer, desk top computer, phone device, video phone, conference phone, television apparatus, digital video recorder (DVR), set-top box (STB), radio apparatus, audio/video player, game device, positioning device, digital camera/camcorder, and/or the like, or any combination thereof. Further the user apparatus 300 may include any combination of features of the application security framework shown and described in regards to FIGS. 1 and 2. The apparatus may also perform any of the processing functions described hereinbelow in regards to FIGS. 4A-B, and 5.

Figure 3:
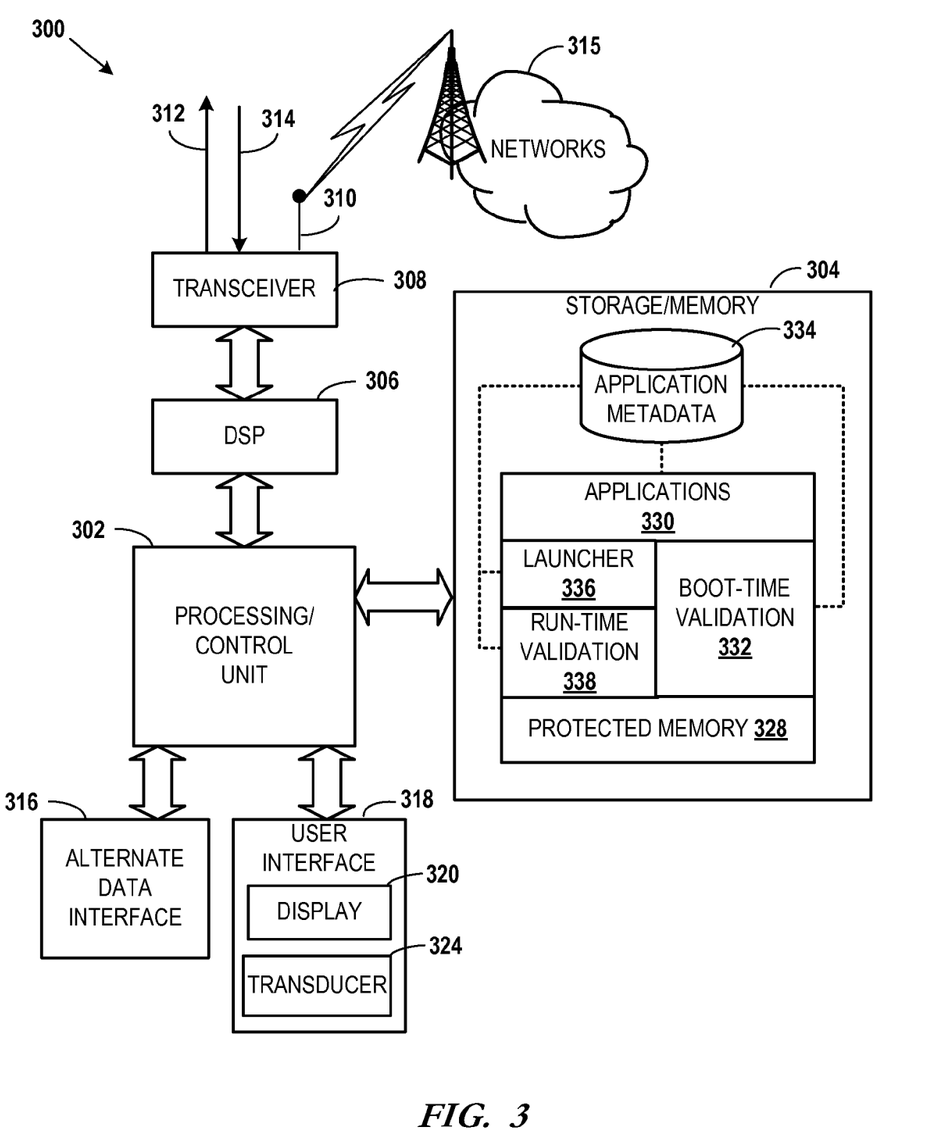
FIG. 3 is a block diagram of a mobile apparatus according to an example embodiment of the invention.

The processing unit 302 controls the basic functions of the apparatus 300. Those functions associated may be included as instructions stored in a program storage/memory 304. In an example embodiment of the invention, the program modules associated with the storage/memory 304 are stored in non-volatile electrically-erasable, programmable read-only memory (EEPROM), flash read-only memory (ROM), harddrive, etc. so that the information is not lost upon power down of the mobile terminal. The relevant software for carrying out operations in accordance with the present invention may also be provided via computer program product, computer-readable medium, and/or be transmitted to the mobile apparatus 300 via data signals (e.g., downloaded electronically via one or more networks, such as the Internet and intermediate wireless networks).

The mobile apparatus 300 may include hardware and software components coupled to the processing/control unit 302. The mobile apparatus 300 may include multiple network interfaces for maintaining any combination of wired or wireless data connections. The illustrated mobile apparatus 300 includes wireless data transmission circuitry for performing network data exchanges. This wireless circuitry includes a digital signal processor (DSP) 306 employed to perform a variety of functions, including analog-to-digital (A/D) conversion, digital-to-analog (D/A) conversion, speech coding/decoding, encryption/decryption, error detection and correction, bit stream translation, filtering, etc. A transceiver 308, generally coupled to an antenna 310, transmits the outgoing radio signals 312 and receives the incoming radio signals 314 associated with the wireless device. These components may enable the apparatus 300 to join in one or more communication networks 315, including mobile service provider networks, local networks, and public networks such as the Internet and the Public Switched Telephone Network (PSTN).

The mobile apparatus 300 may also include an alternate network/data interface 316 coupled to the processing/control unit 302. The alternate data interface 316 may include the ability to communicate via secondary data paths using any manner of data transmission medium, including wired and wireless mediums. Examples of alternate data interfaces 316 include USB, Bluetooth, RFID, Ethernet, 302.11 Wi-Fi, IRDA, Ultra Wide Band, WiBree, GPS, etc. These alternate interfaces 316 may also be capable of communicating via the networks 315, or via direct and/or peer-to-peer communications links.

The processor 302 is also coupled to user-interface hardware 318 associated with the mobile terminal. The user-interface 318 of the mobile terminal may include, for example, display 320. The user-interface hardware 318 also may include a transducer 324, such as an input device capable of receiving user inputs. The transducer 324 may also include sensing devices capable of measuring local conditions (e.g., location temperature, acceleration, orientation, proximity, etc.) and producing media (e.g., text, still pictures, video, sound, etc). Other user-interface hardware/software may be included in the interface 318, such as keypads, speakers, microphones, voice commands, switches, touch pad/screen, pointing devices, trackball, joystick, vibration generators, lights, accelerometers, etc. These and other user-interface components are coupled to the processor 302 as is known in the art.

The program storage/memory 304 includes operating systems for carrying out functions and applications associated with functions on the mobile apparatus 300. The program storage 304 may include one or more of read-only memory (ROM), flash ROM, programmable and/or erasable ROM, random access memory (RAM), subscriber interface module (SIM), wireless interface module (WIM), smart card, hard drive, computer program product, or other removable memory device.

The storage/memory 304 of the mobile apparatus 300 may also include specialized software modules for performing functions according to example embodiments of the present invention. For example, the program storage/memory 304 may include a protected memory portion 328 of RAM that is capable of storing validation values (e.g., checksums, hashes) that verify a state of one or more applications 330 and/or files associated therewith. A boot-time validation module 332 calculates these validation values in response to a device initialization event, such as boot, reset, transition between low-power/standby and full-power modes, etc.

The storage/memory 304 may include application metadata 334 that is usable by the boot-time validation module 332 (and other system component). The application metadata 334 may be part of a database, registry, file, or any other data construct. The application metadata 334 may include data such as names/identifiers of applications 330, critical files used by or included with each application 330, usage data of applications 330, etc.

A launcher 336 may be an operating system component that governs the launching of applications 330, such as by transferring instructions from persistent storage to RAM, creating process identifier, determining/setting privileges, determining/setting priority for CPU time, etc. A run-time validation module 338 detects launch requests targeted for the launcher 336 and, in response, determines current validation data for the application that is to be launched based on existing state of the executables (and other data) as they currently exist in persistent storage. These current values are compared to previously calculated values stored in protected RAM 328. If the comparison shows there has been no change, the validation module 338 allows the launcher 336 to proceed with executing the application process(es).

The run-time validation module 338 may access the application metadata 334 for similar purposes as described for the boot-time module 332, e.g., determining critical files. Although the run-time module 338 may not need to be concerned about relative application priority, the run-time and boot-time modules 338, 332 may be running in parallel, which may give rise to the situation where there is no previously calculated and stored validation data in protected memory 328. In such a case, the run-time module 338 may signal to the boot-time module 332 to perform such validation, e.g., by increasing a relative priority of the requested application. Other arrangements are possible, e.g., the run-time module 338 itself may insert its already calculated value in protected memory and assume that the current application has not been compromised (e.g., apparatus 300 may only have been running for a short amount of time, so likelihood of files being compromised by currently running software is low).

The launcher 336 and/or run-time validation module 338 may also act to update the application metadata 334. For example, the launcher 336 may provide statistics that affects relative priority of applications 330 based on how often application launches are requested. Where data has been compromised, the validation module 338 may flag data as corrupted in the metadata 334, thereby prevent future execution and/or initiate repairs or reinstallation of the affected applications. Such findings may be useful to service providers, device manufacturers, and/or software producers. As such, the run-time module 338 may provide a reporting function that reports incidents of compromised files via network 315.

The mobile apparatus 300 of FIG. 3 is provided as a representative example of a computing environment in which the principles of the present invention may be applied. From the description provided herein, those skilled in the art will appreciate that the present invention is equally applicable in a variety of other currently known and future mobile and landline computing environments. For example, desktop and server computing devices similarly include a processor, memory, a user interface, and data communication circuitry. Thus, the present invention is applicable in any known computing structure where data may be communicated via a network.

Figure 4A:
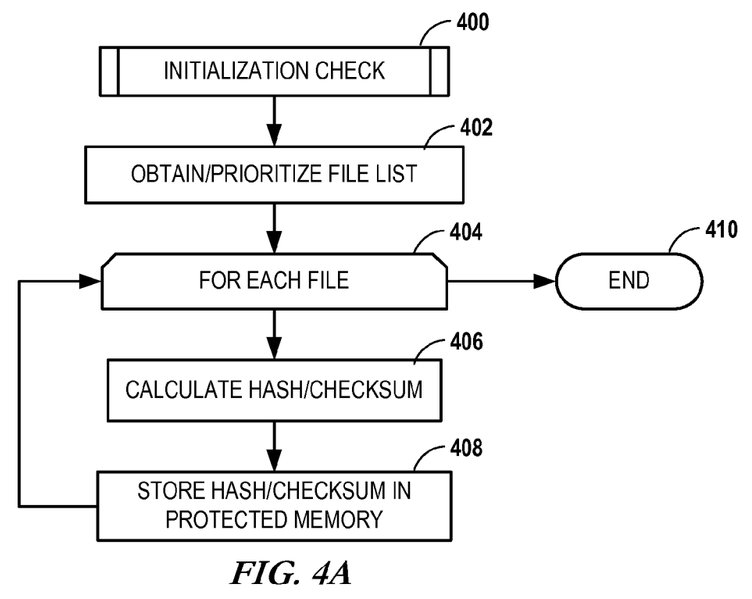
FIGS. 4A, 4B and 5 are a flowcharts illustrating procedures according to example embodiments of the invention

In reference now to FIG. 4A, a flowchart illustrates a procedure 400 for performing an initialization check of applications on an apparatus. The procedure involves obtaining 402 a list of files or other data to be checked. The list may be stored in a specialized database, or obtained any other way (e.g., traversing file directories). This operation 402 may also involve finding or determining relative priorities so that the files most likely to be needed while the procedure 400 is ongoing (e.g., may continue execute in parallel with runtime processes) will be completed first.

Figure 4B:
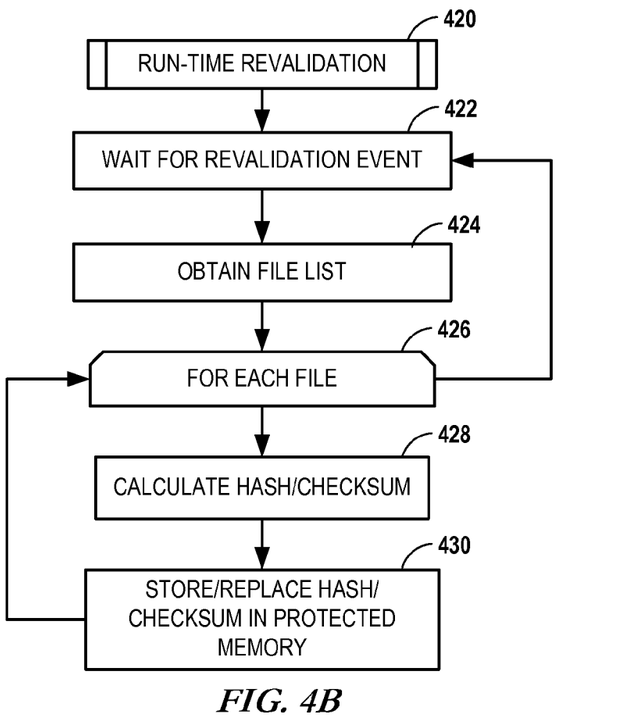

For each file in the list, a loop 404 is entered that involves calculating 406 a hash/checksum for the file, and storing 408 the calculated hash/checksum in protected RAM. When all critical files have been processed, the procedure completes 410. A similar procedure 420 according to an embodiment of the invention is seen in FIG. 4B. This procedure 420 includes an infinite loop that waits 422 for an event that causes some or all application data to be revalidated. Such event may include any post-initialization, run-time event not related to actually launching an application, such as paging some portion of a currently running program, passage of time, software initialization event of an application, installation of a new application, reinstallation of an existing application, etc.

Similar to FIG. 4A, the procedure 420 in FIG. 4B involves obtaining 424 a list (which may also be sorted by priority, although this may not be needed depending on the revalidation event) and a loop 426 iterates through each file, calculating 428 and storing 430 hash/checksum data in protected memory. Such stored hash/checksum data may then be used such as described below. Where the hash/checksum has already been stored (e.g., via procedure in 4A), the storage 430 may involve replacing the corresponding stored validation value in the protected memory portion with an updated validation value.

Figure 5:
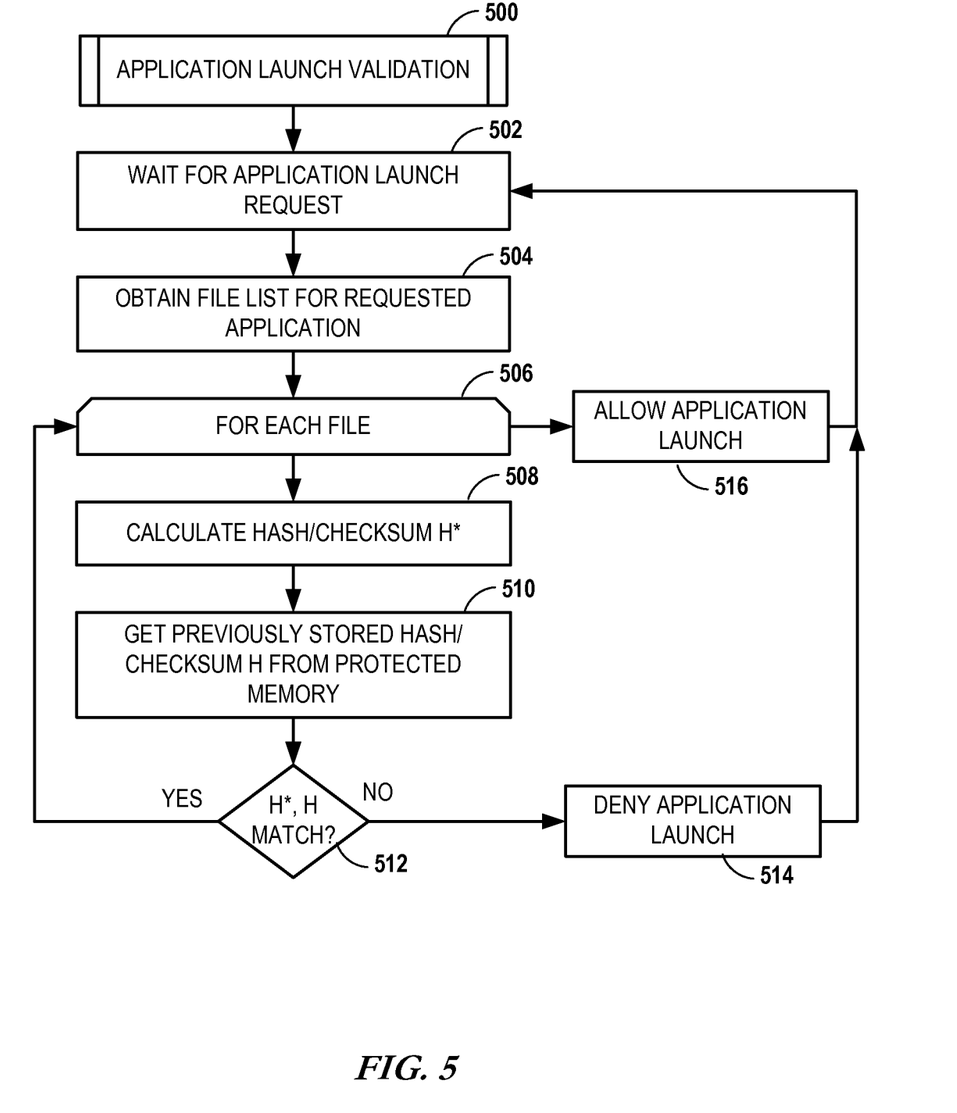

In reference now to FIG. 5, a flowchart illustrates a procedure 500 for performing application launch validation on an apparatus. Such procedure 500 may be performed after initial validation of software such as described above in relation to FIGS. 4A-B. The procedure 500 may be arranged as an infinite loop that waits 502 for an application launch request. A file list 504 for that application is obtained, and a loop 506 iterates through each file. A current hash/checksum (H*) is calculated for the file, and a previously stored hash/checksum H is obtained 510 from protected RAM. The H* and H values are compared 512. If H and H* do not match, then application launch is denied 514 and the procedure breaks out of loop 506 to return to wait state 502. If the loop 506 completes, then the application launch is allowed 516 and wait state 502 is entered.

The foregoing description of the example embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. An apparatus, comprising:
    random access memory comprising a protected memory portion accessible only to processes operating in a privileged mode providing access to a different portion of the random access memory than is provided when operating in a non-privileged mode, with a user application gaining access to the protected memory portion only by using at least one process operating in the privileged mode as an intermediary;
    at least one processor having access to memory storing computer program code comprising executable instructions, wherein the memory storing the computer program code is configured to, with the processor, cause the apparatus to at least: in response to an initialization of the apparatus, calculate a validation value for an application and store the validation value in the protected memory portion;
    determine a paging of a portion of an executable file of the application that occurs after the application has been launched;
    calculate a current validation value for the portion of the executable file;
    compare the current validation value with the stored validation value;
    determine that the corresponding stored validation value is unavailable when comparing the current validation value with the corresponding validation value in an instance in which the calculation of the validation value in the protected memory portion occurs in parallel with determining the paging of the portion of the executable file of the application;
    cause the calculation and storage of the corresponding validation value to occur at a higher priority to facilitate comparing the current validation value with a corresponding one of the stored validation values; and
    regulate execution of the application based on results of the comparison.

2. The apparatus of claim 1, wherein the executable instructions further cause the apparatus to, in response to a run-time event unrelated to launching of the application, recalculate a validation value for the executable file associated with the application and replace the corresponding stored validation value in the protected memory portion with the recalculated value, wherein the run-time event comprises a passage of time since a previous calculation of the corresponding stored validation value.

3. The apparatus of claim 1, wherein the executable instructions further cause the apparatus to establish a priority for each of a plurality of application files based on expected usage, and wherein the calculation and storage of the validation values in the protected memory portion is governed by the respective priorities.

4. The apparatus of claim 1, wherein the calculation and storage of the validation value in the protected memory portion occurs in parallel with determining the paging of the portion of the executable file of the application.

5. A method, comprising:
    in response to an initialization of an apparatus, calculating a validation value for each of a plurality of application executable files and storing the validation values in a protected memory portion of random access memory of the apparatus, wherein the protected memory portion is accessible only to processes operating in a privileged mode providing access to a different portion of the random access memory than is provided with operating in a non-privileged mode, with a user application gaining access to the protected memory portion only by using at least one process operating in the privileged mode as an intermediary;
    determining a paging of a portion of an executable file of the application that occurs after the application has been launched;

calculating a current validation value for an executable file associated with the application;

comparing the current validation value with a corresponding one of the stored validation values;

determining that the corresponding stored validation value is unavailable when comparing the current validation value with the corresponding validation value in an instance in which the calculation of the validation value in the protected memory portion occurs in parallel with determining the paging of the portion of the executable file of the application;

causing the calculation and storage of the corresponding validation value to occur at a higher priority to facilitate comparing the current validation value with a corresponding one of the stored validation values: and regulating launching of the application based on results of the comparison.

6. The method of claim 5, wherein the run-time event comprises a passage of time since a previous calculation of the corresponding stored validation value.

7. The method of claim 5, further comprising establishing a priority for each of the plurality of application files based on expected usage, and wherein the calculation and storage of the validation values in the protected memory portion is governed by the respective priorities.

8. The method of claim 5, further comprising: in response to a software initialization event of the application, calculating an updated validation value for the executable file associated with the application; and replacing the corresponding stored validation value in the protected memory portion with the updated validation value.

9. The method of claim 8, wherein the software initialization event comprises reinstallation of the application.

10. The method of claim 8, wherein the software initialization event comprises an validation of the application during a post-initialization run-time of the apparatus.

11. A method, comprising:

calculating a validation value for an application of an apparatus and storing the validation value in a protected memory portion of random access memory of the apparatus, wherein the protected memory portion is accessible only to processes operating in a privileged mode providing access to a different portion of the random access memory than is provided when operating in a non-privileged mode, with a user application gaining access to the protected memory portion only by using at least one process operating in the system mode as an intermediary;

determining a paging of a portion of an executable file of the application that occurs after the application has been launched;

calculating a current validation value for the portion of the executable file;

comparing the current validation value with the stored validation value;

determining that the corresponding stored validation value is unavailable when comparing the current validation value with the corresponding validation value in an instance in which the calculation of the validation value in the protected memory portion occurs in parallel with determining the paging of the portion of the executable file of the application;

causing the calculation and storage of the corresponding validation value to occur at a higher priority to facilitate comparing the current validation value with a corresponding one of the stored validation values; and regulating execution of the application based on results of the comparison.

12. The method of claim 11, further comprising, in response to a run-time event unrelated to launching of the application, recalculating a validation value for the executable file associated with the application and replace the corresponding stored validation value in the protected memory portion with the recalculated value, wherein the run-time event comprises a passage of time since a previous calculation of the corresponding stored validation value.

13. The method of claim 11, further comprising establish a priority for each of a plurality of application files based on expected usage, and wherein the calculation and storage of the validation values in the protected memory portion is governed by the respective priorities.

14. The method of claim 11, wherein the calculation and storage of the validation value in the protected memory portion occurs in parallel with determining the paging of the portion of the executable file of the application.

* * * * *